Patented Sept. 25, 1928.

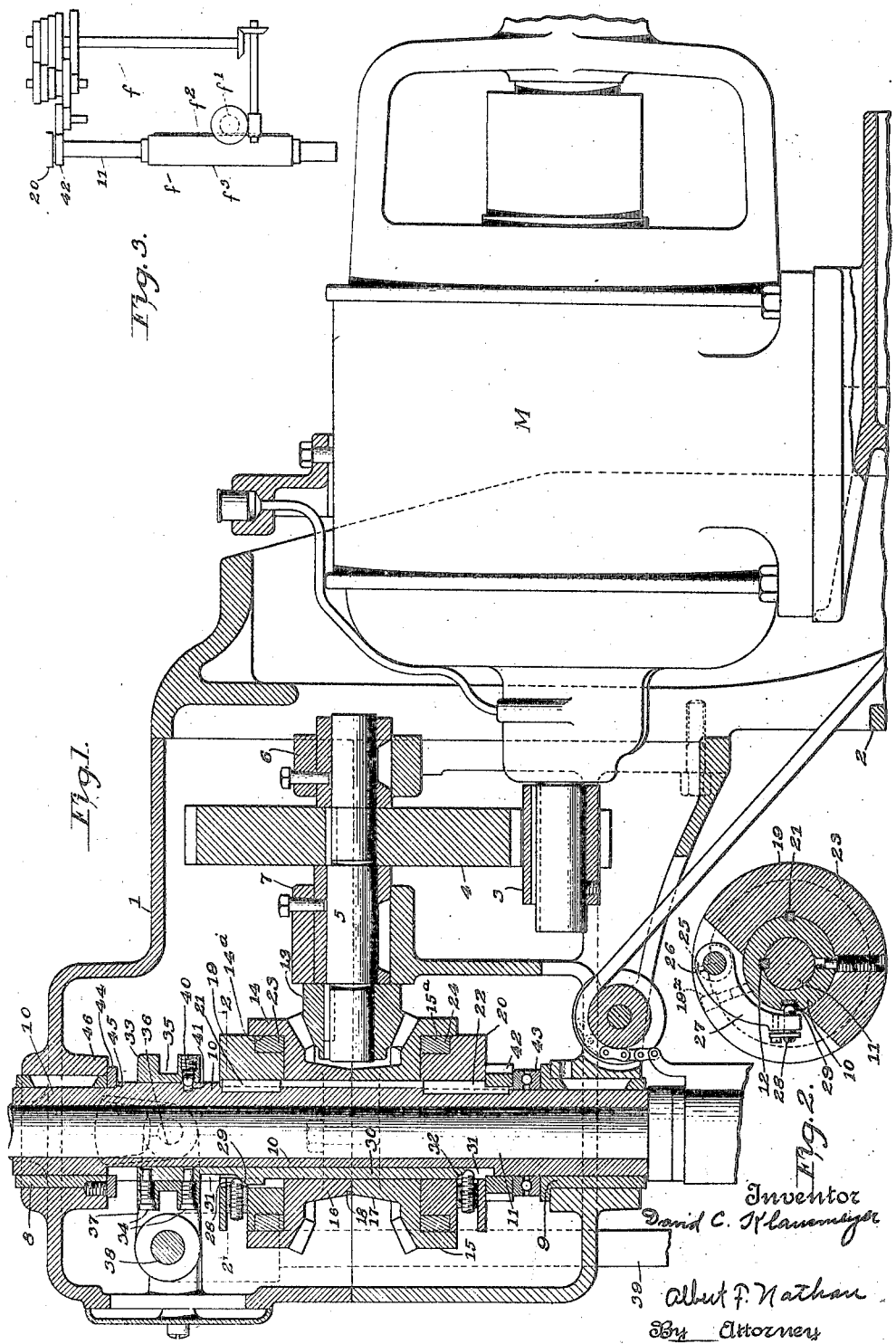

1,685,638

UNITED STATES PATENT OFFICE.

DAVID C. KLAUSMEYER, OF CINCINNATI, OHIO, ASSIGNOR TO THE CINCINNATI BICKFORD TOOL COMPANY, OF OAKLEY, CINCINNATI, OHIO, A CORPORATION OF OHIO.

CONDENSED CLUTCH FOR REVERSING MECHANISMS.

Application filed January 6, 1925. Serial No. 805.

This invention relates to reversing mechanisms and it deals more particularly with that type of reversing mechanism in which two elements are loosely journaled on a sleeve and are simultaneously driven in opposite directions by a common driver, and in which friction clutches serve selectively to render either of the driven elements effective to transmit rotation to the sleeve.

Reversing mechanisms of this type may be used, among other purposes, to rotate, in reverse directions, the spindles of drilling and tapping machines, the forward rotation serving to drill or tap a hole and the reverse rotation serving to withdraw the tap from the hole after the tapping operation is completed.

This invention has for its primary object to overcome certain difficulties existing in the construction of prior frictional reversing mechanisms which have heretofore prevented their installation and satisfactory operation in very small spaces.

A further object of the invention is to provide a frictional reversing mechanism of condensed form and one that is particularly adapted to be embodied in a very small head at the upper end of an upright drilling and tapping machine selectively to rotate the tool spindle in reverse directions.

Another object of the invention is to provide a frictional reversing mechanism of compact form so constructed and arranged as to permit of the use of a relatively small driving pinion and relatively large driven gears.

Still another object of the invention is to provide a compact frictional reversing mechanism of the friction band type in which the driven gears are provided with unusually long bearings, which produce accuracy and durability of the parts, without increasing the size of the mechanism as a whole.

A still further object is to provide a compact frictional reversing mechanism which affords a large gear ratio between the driving and driven gears; in which the clutch-actuating collar is located closely adjacent the rear side of one of the driven gears, and in which the supporting bearings are located close to the driving gears, thus providing a very compact, rigid and durable construction.

Another object of the invention is to provide a reversing mechanism for drill spindles and to utilize a portion thereof as a prime mover for a spindle feeding mechanism by means of which the spindle is translated in its bearings and the tool carried thereby is fed into and out of the work.

These objects have been attained in a reversing mechanism (or clutch as it is usually termed in the machine tool art) in which the two oppositely driven bevel-gears are rotatably journaled on a spindle-driving sleeve by means of long inwardly extending hubs formed on the adjacent face sides of the gears. On their rear sides the gears are constructed to receive friction clutches which selectively serve to secure the gears to the sleeve. These inwardly extending hubs afford long and rigid bearings for the gears and inasmuch as they project from the face of the gear only, the clutches may be arranged to engage the gears closely adjacent their teeth. Thus the combined length of the two gears and the two clutches is materially less than in prior constructions in which the bearing hubs extend rearwardly of the bevel gears. In the preferred embodiment of this invention the usual clutch shifting collar is located behind one of the friction clutches instead of between the oppositely driven gears as in certain prior constructions. This elimination of the collar from between the gears permits them to be brought close together and therefore a small driving pinion may be employed to reversely rotate the gears. This speed reduction at the spindle is a highly desirable feature in upright drilling and tapping machines. The compact arrangement of the gears and clutches also permits the bearings for the sleeve to be located close to the friction clutches which also serve to produce a rigid and durable structure. The above described structure it may be seen as the description proceeds results in a condensed or closely compacted unitary structure which we have herein termed a condensed clutch. The spindle-rotating sleeve preferably carries a spindle feed-actuating gear which is operatively connected with a rack and pinion carried by a non-rotatable sleeve translatable with the spindle.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 1 is a central vertical section of the upper portion of an upright drill embodying the present invention. Fig. 2 is a horizontal section on the line 2—2 of Fig. 1. Fig. 3 is a diagrammatic view representing the spindle feeding mechanism actuated from the sleeve of the reversing mechanism.

Referring more particularly to the drawings the invention is disclosed as embodied in the head 1 of an upright drilling and tapping machine. This head projects horizontally from an upright column 2 which preferably carries a motor M or other power means to rotate and translate the usual tool spindle. Means to reverse the direction of rotation of the tool is preferably located intermediate the prime mover and the spindle. Inasmuch as the head 1 is provided primarily to house the reversing mechanism, the desirability of reducing to a minimum the size of that mechanism will readily be appreciated.

When a motor is employed as a prime mover several speed reductions are required between the prime mover and the spindle. The first of these may conveniently be effected by a speed reduction gearing comprising a pinion 3 on the motor shaft and a relatively large gear 4 fixed to a horizontal shaft 5 journaled in bearings 6 and 7 in the head 1. The present invention affords a second speed reduction between the shaft 5 and the spindle-driving sleeve. For the purpose of describing this invention the shaft 5 may be considered as the driving shaft and will hereinafter be so designated.

Within the head 1 is journaled, in upper and lower bearings 8 and 9 respectively a spindle-driving sleeve 10 within which a tool spindle 11 is translatably but non-rotatably held as by means of a spline 12. The sleeve 10 is adapted to be rotated at a reduced speed and in reverse directions from the shaft 5 and to that end the shaft 5 is provided with a relatively small pinion 13 which is maintained permanently in mesh with relatively large gears 14 and 15. The ratio between the pinion 13 and the gears 14 and 15 is substantially as two-to-one. The gears 14 and 15 engage the pinion at its opposite sides and therefore are rotated continuously in opposite directions.

An important feature of this invention consists in the construction of the gears 14 and 15 and their arrangement on the spindle-driving sleeve 10. As has hereinbefore been described this invention provides an extremely compact arrangement without sacrificing rigidity or durability of the parts. The gears 14 and 15 are provided with long bearing hubs 16 and 17 respectively which project inwardly from the faces of the gears and preferably, but not necessarily, abut against each other as indicated at 18. The rear sides of the gears, that is the sides opposite the hubs, are formed as chambers within which are located clutch collars 19 and 20 secured to the sleeve 10 by keys 21 and 22 respectively. Intermediate the collars 19, 20 and the walls 14ª and 15ª of the chambers are expansible friction clutch bands 23 and 24. Inasmuch as these friction clutches are alike a description of the upper one will suffice. The clutch band 23 is split and one end thereof abuts against a stud 19ˣ carried by the collar 19. The opposite end of the clutch band rests against a cam surface 25 provided by a pin 26 journaled in the collar 19 and adapted to be oscillated by a lever 27 secured at one end to the pin. The opposite end of the lever carries a contact screw 28 adapted to engage a cam 29 provided by a bar 30 slidably mounted in a way 31 in the sleeve 10. Thus endwise movement of the bar in one direction actuates the lever 27 and causes the band 23 to lock together the gear 14 and the collar 19 fixed to the spindle driving sleeve thereby rotating the sleeve in one direction. The bar 30 also provides a cam portion 32 which, upon movement of the bar in the opposite direction, actuates the lower clutch and causes the gear 15 to rotate the sleeve 10 in a reverse direction.

Shifting of the bar 30 is preferably effected by means of a collar 33 slidably mounted upon the sleeve 10 adjacent the clutch collar 19 and between the collar and the sleeve bearing 8. The collar is secured to the bar as by means of screws 34 and is formed with an annular groove 35 within which extends a pin 36 carried by a clutch shifting arm 37. The arm 37 is fixed to a shaft 38 journaled in the head 1 and a lever 39 also secured to the shaft affords means to oscillate the shaft in opposite directions selectively to actuate the clutches. A spring detent 40 carried by the collar 33 engages a detent notch 41 in the sleeve 10 and provides means to impositively hold the collar in its neutral position.

Secured to the sleeve 10, adjacent the clutch collar 20, is a spindle-feed drive-gear 42. This gear drives a suitable train of mechanism illustrated diagrammatically in Fig. 3 and designated generally as $f$. This train includes a pinion $f'$ in mesh with a rack $f^2$ fixed to a spindle translating sleeve $f^3$ within which the spindle is rotatably journaled. The sleeve $f^3$ is held against rotation and relative endwise movement between the sleeve and the spindle is prevented by suitable collars as is common in prior machines. Thus it will be perceived that rotation of the sleeve 10, forming a part of the reversing mechanism, will, through the train $f$ and the rack and pinion $f^2$ and $f^1$ respectively, effect endwise movement of the tool spindle 11 to cause the tool carried thereby to enter into and emerge from the work.

An anti-friction thrust bearing 43 is arranged intermediate the gear 42 and the sleeve bearing 9 and serves freely to support the sleeve, gears and clutches against endwise movement downwardly. Upward movement of the sleeve is prevented by a ring 44 intermediate a shoulder 45 on the sleeve 10 and the lower face of a bearing hub 46 provided by the head 1.

From the foregoing it will be perceived that there has been provided a reversing mechanism in which the reversely rotated gears are provided with substantial bearings; in which the gears are so arranged as to permit the use of a small driving pinion; in which the clutches are brought in close to the driven gears; in which the reversing mechanism may be utilized to actuate a spindle feed-mechanism, and in which the entire structure makes for compactness, rigidity and durability.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A spindle rotating and translating mechanism for drilling and tapping machines comprising a drive-shaft; a spindle-driving sleeve; a spindle translatably but non-rotatably mounted in the sleeve; a bevel pinion on said drive-shaft, two reversely rotating bevel-gears on said sleeve permanently in mesh with opposite sides of said pinion; a clutch associated with each of said bevel-gears; means to actuate said clutches selectively to cause either of said gears to rotate said sleeve; means to translate said spindle in said sleeve, said means including a rack vertically movable with said spindle; a feed pinion meshing with said rack; a feed gear fixed to said sleeve; and an operative connection between said feed gear and said feed pinion.

2. A reversing mechanism combining a housing, a spindle-driving sleeve journaled in upper and lower vertically disposed bearings carried by said housing; a horizontal drive-shaft; a pinion on said drive-shaft; two bevel-gears rotatably journaled on said sleeve and maintained permanently in mesh with opposite sides of said pinion whereby they are rotated reversely; a friction clutch associated with each of said bevel-gears; an anti-friction thrust bearing intermediate one of said friction clutches and the lower sleeve bearings; a collar slidably mounted on said sleeve between the other friction clutch and the upper sleeve bearing; an operative connection between said collar and each of said friction clutches; and means to shift said collar in opposite directions on said sleeve selectively to cause said clutches to lock said gears to said sleeve.

3. A reversing mechanism combining a housing, a spindle-driving sleeve journaled in upper and lower vertically disposed bearings carried by said housing; a horizontal drive-shaft; a pinion on said drive-shaft; two bevel-gears rotatably journaled on said sleeve and maintained permanently in mesh with opposite sides of said pinion, whereby they are rotated reversely; a friction clutch associated with each of said bevel-gears; a collar slidably mounted on said sleeve between one of said friction clutches and the upper sleeve bearing; a detent cooperating with said collar to hold it impositively against movement on said sleeve; an operative connection between said collar and each of said friction clutches; and means to overcome the action of said detent and to shift said collar in opposite directions on said sleeve selectively to cause said clutches to lock said gears to said sleeve.

4. A spindle rotating and translating mechanism comprising a driving shaft; a spindle-driving sleeve; a bevel-gear connection between said shaft and said sleeve comprising a bevel-gear on said driving shaft and two reversely rotated bevel-gears on said sleeve permanently in mesh with opposite sides of the driving gear; means for selectively clutching said two bevel-gears to said sleeve; a spindle splined in said sleeve; a rack vertically movable with said spindle; a pinion in mesh with said rack; a spindle feed-gear fixed to said sleeve adjacent one of said gear clutching means; and an operative connection between said feed gear and said pinion.

5. A reversing mechanism combining a sleeve; two relatively large gears each having a long inwardly extending hub rotatably journaled on said sleeve; a relatively small driving-gear permanently in mesh with said two large gears and rotating them in reverse directions; means to rotate said driving gear; a chamber formed in the face of each of said large gears opposite to that to which the hub extends; a clutch-collar secured to said sleeve and having a portion extending into said chamber; an expansible split friction clutch-band in said chamber intermediate said gear and said clutch-collar and held against relative rotary movement with said collar; and means to expand said band to effect a driving connection between said gear and said clutch collar, said means including a cam acting upon one end of said band, a lever adapted to actuate said cam, a collar slidably mounted on said sleeve behind one of said gears, a rod attached to said collar and slidably fitted in the sleeve and provided with portions adapted, upon translation of the rod, to actuate said lever, and means to shift said collar.

6. A reversing mechanism combining a driving shaft; a driving pinion of relatively small diameter secured thereto; a spindle driving sleeve; a spindle splined within said sleeve; two bevel gears of relatively large diameter rotatably journaled on said sleeve and maintained permanently in mesh with said driving pinion, each of said gears having formed integral with it an inwardly extending hub, the two of which abut substantially in alignment with the axis of the driving shaft, and an outwardly extending annular portion providing an internal chamber extending thereinto substantially into alignment with the teeth of the gear; a member rotatable with said shaft and extending into said chamber to the full depth thereof; an expansible ring located within said chamber intermediate the last named member and the wall of said chamber; a lever fulcrumed upon said last named member and acting to expand said ring; a slide bar having cam portions adapted to actuate said levers; and means to shift said slide bar.

In witness whereof, I have hereunto subscribed my name.

DAVID C. KLAUSMEYER.